(12) United States Patent
Doleh et al.

(10) Patent No.: US 10,145,353 B2
(45) Date of Patent: Dec. 4, 2018

(54) SHUTTER VALVE AND DEVICE FOR GENERATING ENERGY FROM SEA WAVES COMPRISING SUCH VALVES

(71) Applicants: Zakaria Khalil Ibrahim Doleh, Dubai (AE); John Lock, Edinburgh (GB)

(72) Inventors: Zakaria Khalil Ibrahim Doleh, Dubai (AE); John Lock, Edinburgh (GB)

(*) Notice: Subject to any disclaimer, the term of this patent is extended or adjusted under 35 U.S.C. 154(b) by 217 days.

(21) Appl. No.: 15/315,475

(22) PCT Filed: Jun. 2, 2015

(86) PCT No.: PCT/EP2015/062241
§ 371 (c)(1),
(2) Date: Dec. 1, 2016

(87) PCT Pub. No.: WO2015/185543
PCT Pub. Date: Dec. 10, 2015

(65) Prior Publication Data
US 2018/0209396 A1    Jul. 26, 2018

(30) Foreign Application Priority Data

Jun. 4, 2014    (EP) .................................... 14171058

(51) Int. Cl.
*F16K 1/22*    (2006.01)
*F03B 13/18*    (2006.01)
(Continued)

(52) U.S. Cl.
CPC .......... *F03B 13/1875* (2013.01); *F03B 13/20* (2013.01); *F16K 1/223* (2013.01);
(Continued)

(58) Field of Classification Search
USPC ...... 290/53, 54; 60/502; 137/601.06, 601.09
See application file for complete search history.

(56) References Cited

U.S. PATENT DOCUMENTS 3,426,507 A * 2/1969 Kossowski ............... B03C 3/74
137/601.11
3,549,438 A * 12/1970 Hoornstra ................ B41N 1/18
134/113

(Continued)

FOREIGN PATENT DOCUMENTS

DE    285438    6/1915
GB    188728    11/1922
(Continued)

*Primary Examiner* — Pedro J Cuevas
(74) *Attorney, Agent, or Firm* — Marcus C. Dawes; Daniel L. Dawes

(57) ABSTRACT

A shutter valve for alternatingly allowing and stopping a high pressure water flow, such as in a device for generating energy from sea waves, comprising a tube section (201) having a rectangular cross section, wherein a multitude of vanes (202) are rotatably mounted in the tube section (201), wherein the vanes have a relatively large rectangular longitudinal cross section in a first direction, a relatively flat rectangular longitudinal cross section in a second direction perpendicular to said first direction, and a generally flat cross section in a third direction perpendicular to said first and second directions, said third direction being the axis of the vane (202), wherein the circumferential wall around the axis of each vane forms a closed water impermeable surface, wherein the axes of said multitude of vanes all extend in a parallel manner, characterized in that the distances between the axes of adjacent vanes are approximately half the distance between the outer tips of the vanes, seen in the cross section in said third direction, such that when the vanes are rotated to the closed position the lower half of the front surfaces and upper half of the back surfaces of all vanes form a single closed front surface and a single closed back surface, each in substantially a single flat plane perpendicular to the flow axis of the valve, said surfaces closing the opening of said tube section, and the other half of said front (Continued)

surfaces and the other half of said back surfaces of said vanes rest against each other.

14 Claims, 7 Drawing Sheets

(51) Int. Cl.
    *F03B 13/20*     (2006.01)
    *F16K 31/54*     (2006.01)
    *F16K 31/163*     (2006.01)

(52) U.S. Cl.
    CPC .......... *F16K 31/1635* (2013.01); *F16K 31/54* (2013.01); *F05B 2240/97* (2013.01); *F05B 2270/506* (2013.01); *Y02E 10/38* (2013.01)

(56) References Cited

U.S. PATENT DOCUMENTS

| | | | | |
|---|---|---|---|---|
| 3,620,242 A * | 11/1971 | Pease | ......................... | F16K 1/16 137/240 |
| 3,749,115 A * | 7/1973 | Raftis | ..................... | F16K 1/165 137/246.22 |
| 4,077,432 A * | 3/1978 | Herr | ......................... | F16K 1/165 137/246.22 |
| 4,187,878 A | 2/1980 | Hughey | | |
| 4,191,212 A * | 3/1980 | Hagar | ..................... | F16K 1/165 137/246.22 |
| 4,412,556 A * | 11/1983 | Janich | ..................... | F16K 1/221 137/601.08 |
| RE31,471 E * | 12/1983 | Hagar | ..................... | F16K 1/165 137/246.22 |
| 4,441,316 A | 4/1984 | Moody | | |
| 4,594,853 A * | 6/1986 | Raichlen | ................ | F03B 13/187 60/502 |
| 4,698,969 A * | 10/1987 | Raichlen | ................ | F03B 13/187 210/121 |
| 5,000,422 A * | 3/1991 | Houston | .................. | F16K 1/226 137/246.22 |
| 5,105,094 A | 4/1992 | Parker | | |
| 5,159,954 A * | 11/1992 | Janich | ..................... | F23L 11/00 137/246.22 |
| 5,947,051 A * | 9/1999 | Geiger | .................... | B62D 57/00 114/222 |
| 7,355,298 B2 * | 4/2008 | Cook | ..................... | F03B 13/148 290/53 |
| 7,419,366 B2 * | 9/2008 | Doleh | ..................... | F03B 13/147 417/333 |
| 7,963,111 B2 * | 6/2011 | Doleh | ................. | F03B 13/1875 290/1 R |
| 8,269,364 B2 * | 9/2012 | Lai | ........................... | F03B 13/26 290/53 |
| 8,698,338 B2 * | 4/2014 | Slocum | ................... | F03B 13/06 290/54 |
| 9,395,098 B2 * | 7/2016 | Enke | ....................... | F24F 13/14 |
| 9,625,174 B2 * | 4/2017 | Koop | ................... | F24F 13/1413 |
| 2004/0031265 A1* | 2/2004 | Doleh | .................... | F03B 13/147 60/398 |
| 2014/0110943 A1 | 4/2014 | Tagansky | | |

FOREIGN PATENT DOCUMENTS

| | | |
|---|---|---|
| WO | WO-2006051393 | 5/2006 |
| WO | WO-2014042555 | 3/2014 |

\* cited by examiner

SHUTTER VALVE AND DEVICE FOR GENERATING ENERGY FROM SEA WAVES COMPRISING SUCH VALVES

The invention relates to a device for generating energy from sea waves, comprising a float for following the movement of sea waves, a pump chamber having a variable volume for holding a variable volume of water, said pump chamber volume being arranged to change by the force exerted by said moving float, wherein said pump chamber comprises a water supply tube and a water discharge tube, wherein said supply tube and said discharge tube are each provided with a valve, wherein said valves are arranged to close and open in alternating fashion with a cycle frequency equal to the cycle frequency of the sea waves.

Given that the periodic time of sea wave swells is remarkably constant throughout the world and lies between 8 sec and 10 sec, it is imperative that the valves controlling inlet and outlet of sea water must be able to switch off and on fast, preferably in less than 1 second. Ball valves or butterfly valves of large diameters and which are designed for high pressure liquid flows are unlikely to switch in less than 1 second. The object of the invention is to provide a solution to this problem.

To that end at least one, preferably both, of the valves is a shutter valve comprising a tube section having a rectangular cross section, wherein a multitude of vanes are rotatably mounted in the tube section, wherein the vanes have a relatively large rectangular longitudinal cross section in a first direction, a relatively flat rectangular longitudinal cross section in a second direction perpendicular to said first direction, and a generally flat cross section in a third direction perpendicular to said first and second directions, said third direction being the axis of the vane, wherein the circumferential wall around the axis of each vane forms a closed water impermeable surface, wherein the axes of said multitude of vanes all extend in a parallel manner, and wherein the distances between the axes of adjacent vanes are approximately half the distance between the outer tips of the vanes, seen in the cross section in said third direction, such that when the vanes are rotated to the closed position the lower half of the front surfaces and upper half of the back surfaces of all vanes form a single closed front surface and a single closed back surface, each in substantially a single flat plane perpendicular to the flow axis of the valve, said surfaces closing the opening of said tube section, and the other half of said front surfaces and the other half of said back surfaces of said vanes rest against each other.

Preferably the vanes have a generally flat-rhombic cross section in a third direction perpendicular to said first and second directions, whereby in the closed position the distance between the closing surfaces of the interlocked vanes is substantial, forming a massive thick closing member, whereby the valve can withstand high pressures. At the sides next to the two outer vanes, preferably the tips of the vanes rest against matching ridges extending from the inner wall of the tube section.

Preferably, at the outer ends of the vanes shaft ends extend from the vanes along the axis of the vanes, said shaft ends extending through holes in said tube section. The array of vanes can preferably be rotated by means of a rack mating with pinions attached to the shaft ends on at least one outer side of the tube section. The rack is preferably arranged to be moved by a hydraulic cylinder, and said cylinder is preferably controlled by a hydraulic Moog valve.

The invention also relates to a shutter valve for alternatingly allowing and stopping a high pressure water flow, comprising a tube section having a rectangular cross section, wherein a multitude of vanes are rotatably mounted in the tube section, wherein the vanes have a relatively large rectangular longitudinal cross section in a first direction, a relatively flat rectangular longitudinal cross section in a second direction perpendicular to said first direction, and a generally flat cross section in a third direction perpendicular to said first and second directions, said third direction being the axis of the vane, wherein the circumferential wall around the axis of the of each vane forms a closed water impermeable surface, wherein the axes of said multitude of vanes all extend in a parallel manner, and wherein the distances between the axes of adjacent vanes are approximately half the distance between the outer tips of the vanes, seen in the cross section in said third direction, such that when the vanes are rotated to the closed position the lower half of the front surfaces and upper half of the back surfaces of all vanes form a single closed front surface and a single closed back surface, each in substantially a single flat plane perpendicular to the flow axis of the valve, said surfaces closing the opening of said tube section, and the other half of said front surfaces and the other half of said back surfaces of said vanes rest against each other.

U.S. Pat. No. 4,187,878 describes a shutter valve for the control of gasses, utilizing a plurality of plate-like closure elements which are generally Z-shaped in cross section. The closure elements have a rectangular hole (labelled as 22 in FIG. 4) which lets the air pass through the valve when it is in the open position. The valve frame is webbed to give the closure element stiffness across the valve opening. The plate-like closure elements are not interlocking vanes, as their surfaces do not rest against each other. A blower can be attached to the valve frame in such a way as to cause positive pressure to blow across seals to clean them of contamination and hence prevent leakage. The valve actuator is a simple shutter mechanism. The valve arrangement of the preferred embodiment of the current invention utilizes a plurality of hydrodynamic vanes that interlock across the full width of the valve opening; the actuator is a hydraulic system controlled by a Moog type flow control arrangement which allows full automatic control of the vane movements.

The invention will be illustrated by means of a preferred embodiment, with reference to the drawings, in which:

FIG. 1 schematically shows a an energy generating device for generating energy from an undulating movement of a medium such as seawater;

Figure 1:
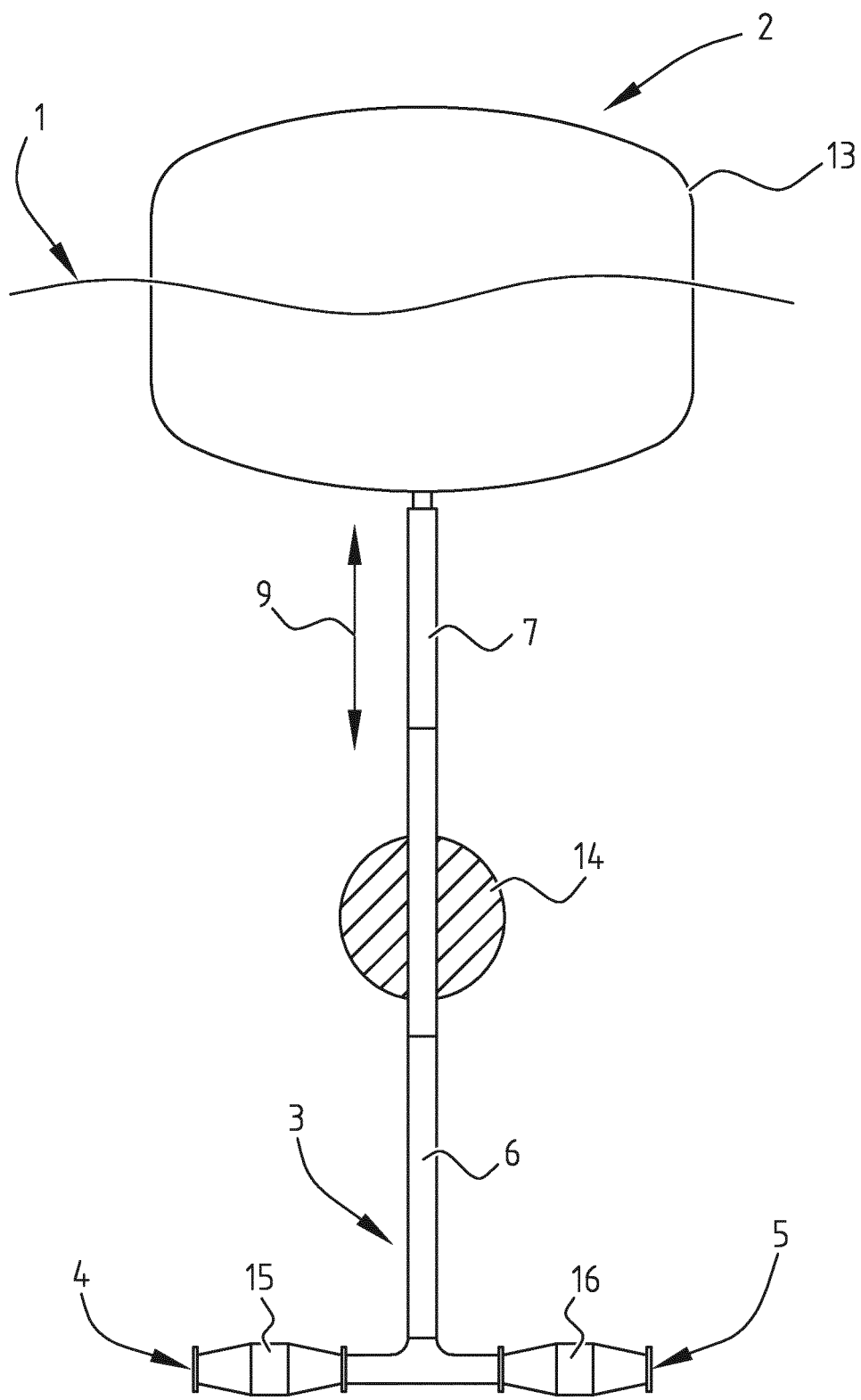

FIG. 1 schematically shows a an energy generating device, embodiments of which are described in WO 2006/051393, incorporated into the present application by means of explicit reference, for generating energy from an undulating movement of a medium such as seawater, wherein this movement is followed during the movement of the medium, wherein the followed movement is converted into energy, and wherein a direction of movement of the movement changes at a point in time.

FIG. 1 shows the water level 1. A part of energy generating device 2 is arranged in the water. The part is shown which, under the influence of swelling in water level 1, will cause a pumping action which can be used for energy generation. Not shown is for instance a turbine, which will ultimately be used to convert the pumping action of the shown part of FIG. 1 into for instance electrical energy. The skilled person will be able to apply different energy generating means in suitable manner on the basis of the operation.

Energy generating device 2 has a fixedly arranged frame 3, for instance fixedly connected to the seabed. This comprises a supply tube 4, a discharge tube 5 and a substantially vertically core pipe 6. The tubes are connected to a fluid source, for instance water. Through the action of energy generating device 2 water will be pumped, drawn in via feed 4 and pumped out via discharge 5. A turbine is for instance coupled to discharge 5 for the actual generation of energy.

Together with sleeve pipe 7 core pipe 6 forms an inner pump chamber. Sleeve pipe 7 can slide over the standing outer end of core pipe 6. Movement herein takes place as according to arrow 9. The standing core pipe 6 has for instance an outer surface of plastic and the sliding cover has for instance a thin stainless steel inner wall. In order to allow the two parts to slide over each other without too much friction occurring therein, a brass collar can for instance be arranged close to the outer end of core pipe 6. This can be connected thereto by means of an adhesive. A sliding fitting is hereby formed for the stainless steel cover. According to another embodiment, the standing core pipe 6 is also a stainless steel pipe too. The inner diameter of the outer pipe is drilled so that it obtains a smooth finish and the outer diameter of the inner pipe is ground with a precision cylindrical grinder so that a sliding fitting between the pipes is obtained. Blocking and leakage are hereby minimized.

A float 13 is connected to cover 7, and floats in and on water level 1. A ballast 14 attached to the sleeve pipe 7 pulls the float downward. When the water level rises, for instance in a wave, the float 13 will be moved upward whereby the sleeve pipe 7 is moved upward as according to arrow 9, and the pump chamber is enlarged. In a wave trough the opposite occurs. A valve 15 is arranged in supply tube 4 and a valve 16 in discharge tube 5. The feed and/or the discharge can hereby be closed.

Valves 15, 16 are actively regulated valves which can be switched, i.e. opened or closed, at determined times. The determined times at which switching takes place depend on the wave cycle. The control of valves 15, 16 can be connected to a control device (not shown).

Given that the periodic time of sea wave swells is remarkably constant throughout the world and lies between 8 sec and 10 sec, it is imperative that the valves 15, 16 controlling inlet and outlet flows to a point source device must be able to switch off and on quickly (i.e. <1 sec).

The physical size of the sleeve pipe 7, core pipe 6 and the physical size and construction of the inlet control valve 15 and the outlet control valve 16 is dependent on the size of the float 13 as follows:
Let the diameter of the float 13=D meters
Let the diameter of the core pipe 6=d meters
Let the density of sea water=$\rho$ kg/m$^3$=1024 kg/m$^3$
Let the gravitational acceleration=g m/s$^2$=9.81 m/s$^2$
Let the wave height=h If the control valves are configured so as to cause the float to move 180° out of phase with the wave the maximum force acting on the inner core pipe 6 will be given by:

$F=\pi D^2 h\rho g/4$ Newton (N)

The maximum pressure acting on the core pipe 6 will be given by:

$$P = \frac{F}{\text{Cross-sectional area of the core pipe}} =$$

$$\frac{4\pi D^2 h\rho g}{4\pi d^2} = h\rho g \left(\frac{D}{d}\right)^2 \frac{N}{m^2} = h\rho g \left(\frac{D}{d}\right)^2 \times 10^{-5} \text{bar}$$

It is important to ensure that this pressure is realizable by choosing an appropriate core pipe 6 diameter. For a float 13 diameter of 5 meters, a core pipe 6 diameter of 0.3 meters and a wave height of 0.5 meters, the pressure in the pump would be as follows:

$$P = 0.5 \times 1024 \times 9.81 \left(\frac{5}{0.3}\right)^2 \times 10^{-5} = 13.95 \text{ bar say 14 bar}$$

This is a reasonable working pressure and we will use this pressure to determine the core pipe 6 diameter for larger float 13 diameters. We can transpose the pressure equation to make the subject the core pipe 6 diameter as follows:

$$d = D \left(\frac{h\rho g}{P \times 10^5}\right)^{0.5} \text{meters}$$

Suppose we wish to calculate the core pipe 6 diameter for a float 13 diameter of 20 meters, a wave height of 5 meters and a working pressure of 14 bar this would be:

$$d = 20 \left(\frac{5 \times 1024 \times 9.81}{14 \times 10^5}\right)^{0.5} = 3.788 \text{ meters}$$

Clearly ball valves or butterfly valves of these diameters would be unlikely to switch in less than 1 second, so this invention proposes a solution to the problem. First, it is necessary to explain why it is crucial to accommodate fast switching. Because there are two control valves involved in the pumping action, the outlet control valve 16 must be switched off and the inlet control valve 15 must begin to open in a controlled manner so as to allow the float 13 to rise without causing a water hammer effect. As the float 13 rises, the inlet valve 15 is closed in a sinusoidal motion so as to allow the float 13 to follow the inverse profile of the wave motion. When the float reaches the top of its stroke the inlet valve 15 will be completely closed and it will stay this way until the end of the wave cycle. Similarly, when the float 13 is at the top of its stroke with the inlet valve 15 fully closed the outlet valve 16 begins to open in a controlled manner to allow water to be discharged from the pump. Again the outlet valve 16 is closed in a sinusoidal motion so as to allow the float 13 to follow the inverse profile of the wave motion. It is at the end of the wave cycle that the need for fast switching becomes apparent because at that point the outlet valve 16 must be returned to the closed position and then the inlet valve 15 must be returned to the open position to allow the cycle to be repeated.

Figure 2:
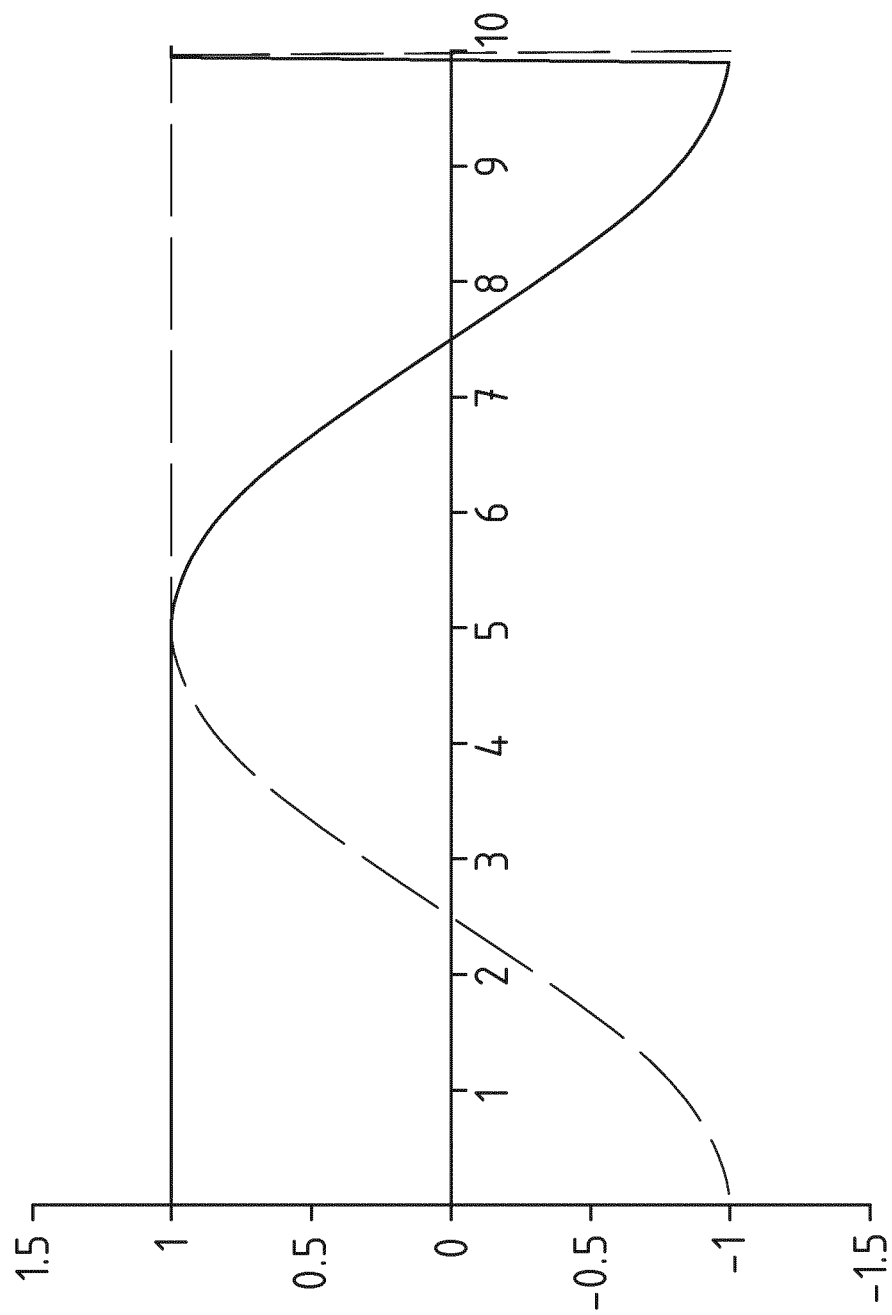
FIGS. 2 and 3 show graphs compare near ideal switching behavior with actual switching behavior of the water valves used in the device of FIG. 1.
Figure 3:
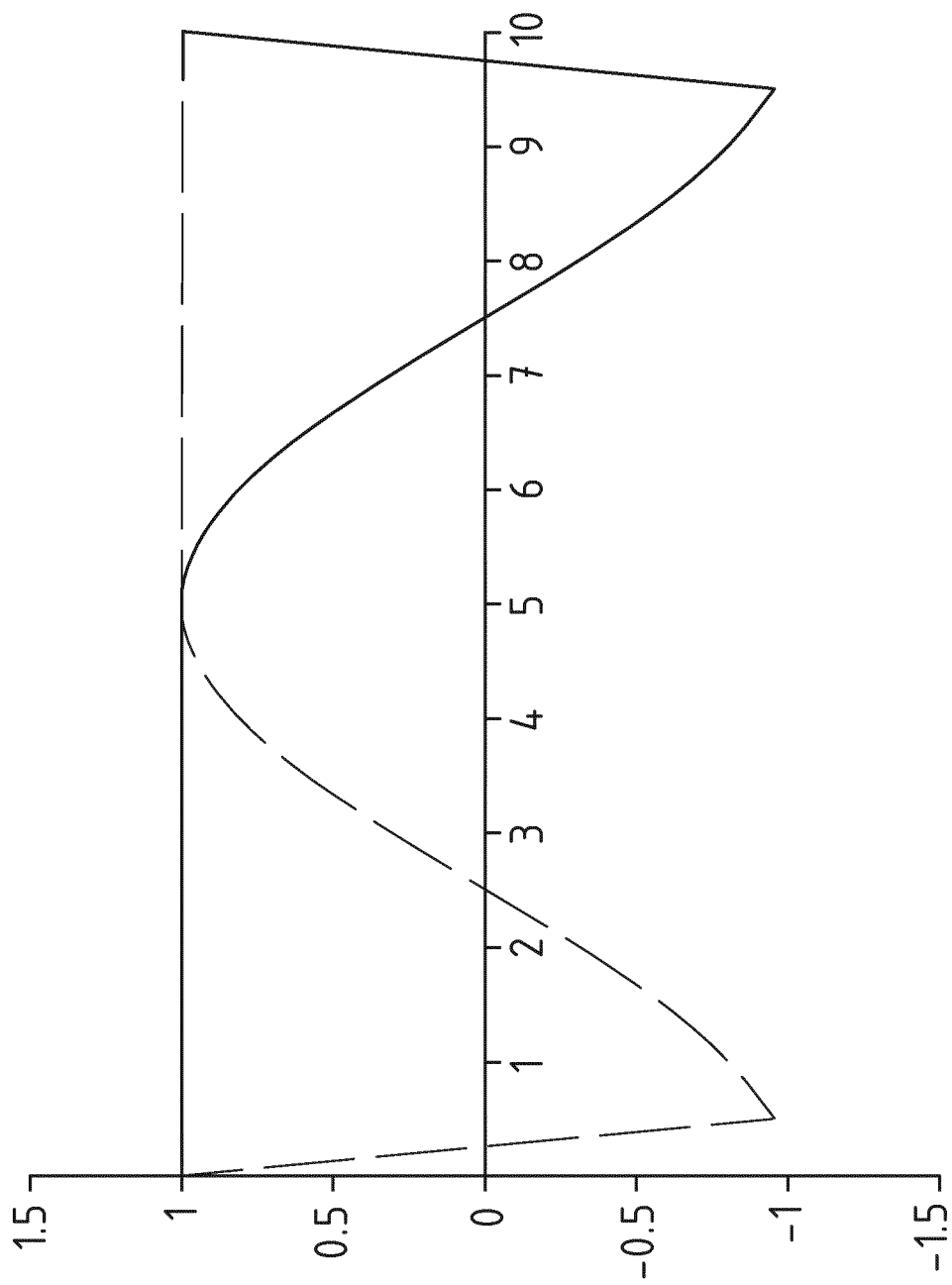

In an ideal world these switching actions would be instantaneous, but such is not the case in the real world. There will always be a finite time for the valves to switch and this causes dead-time at the end of the cycle. This, in turn, means that the float 13 movement is clipped at the bottom of its stroke. The graphs shown in FIGS. 2 and 3 compare near ideal switching behavior (FIG. 2) with actual switching behavior (FIG. 3) with a switch time of 0.5 sec. In these figures the dashed line represents the inlet valve 15 movement, and the solid line represent the outlet valve 16 movement (on the vertical axis 1 is valve closed, −1 is valve open).

According to FIG. 2 the outlet valve 16 must be switched off before the inlet valve 15 can be switched on. According to FIG. 3 the valves 15, 16 are never fully open which means that the inflows and outflows are never maximized. Consequently there is an efficiency drop and this drop in efficiency will increase as the switching time is increased. So it is imperative that fast switching is realized. Ball valves and butterfly valves have round moving members and it has already been stated that large diameter moving parts are incapable of fast switching.

Figure 4:
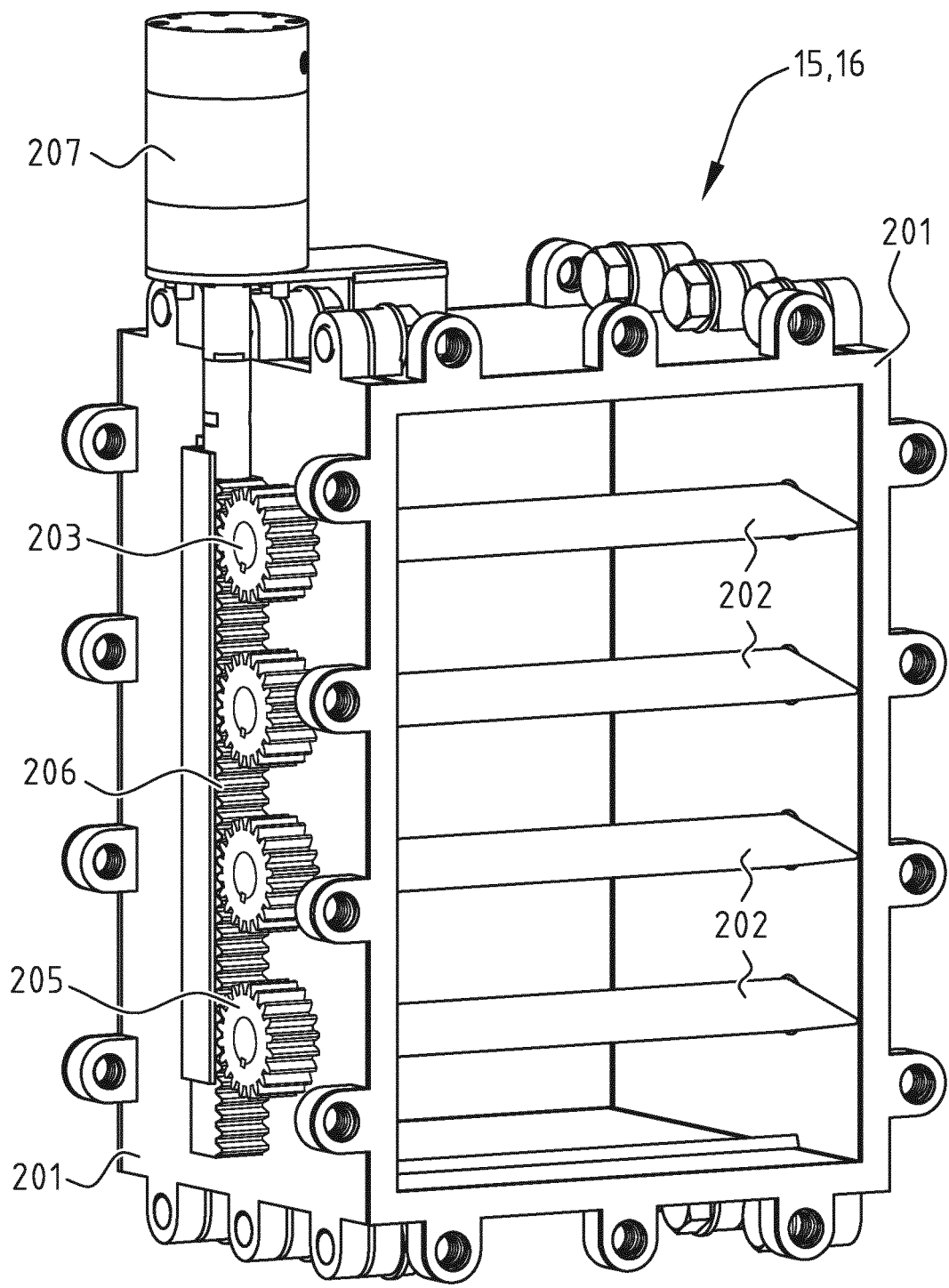
FIGS. 4 and 5 show perspective views of an embodiment of a valve in accordance with the invention in respectively an open and a closed position.
Figure 5:
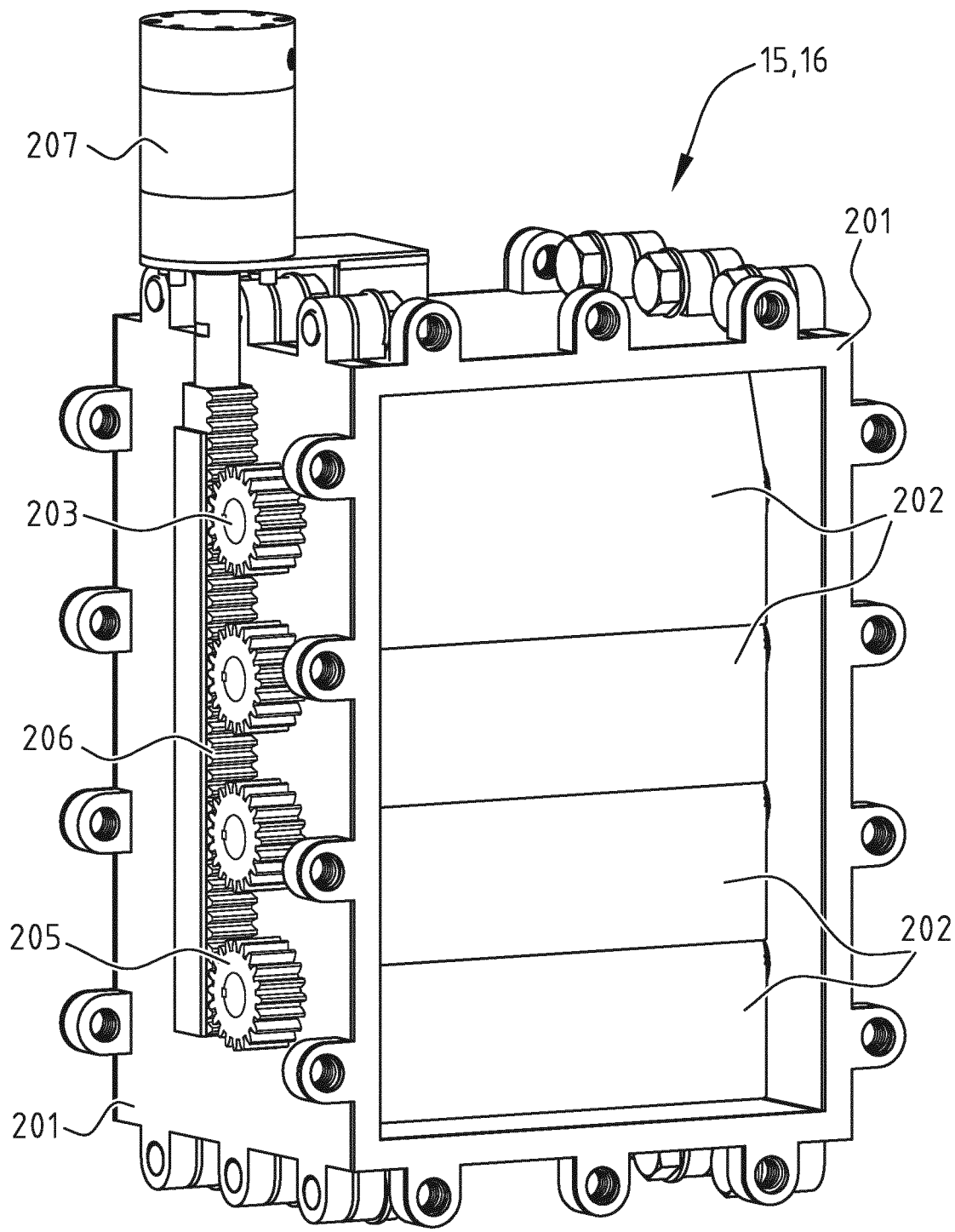
Figure 6:
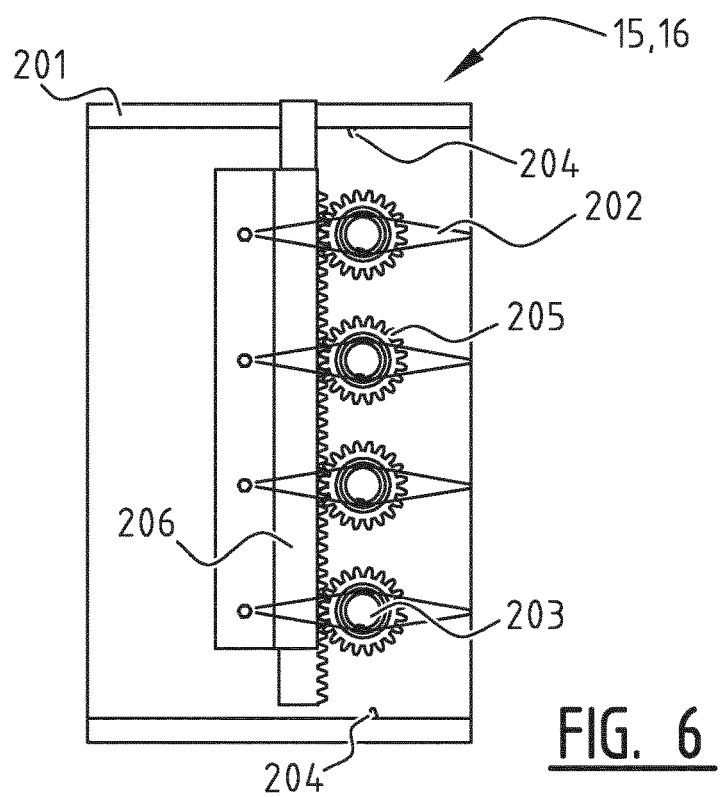
FIGS. 6 and 7 show partly opened side views of the valve as shown in FIGS. 4 and 5 respectively.
Figure 7:
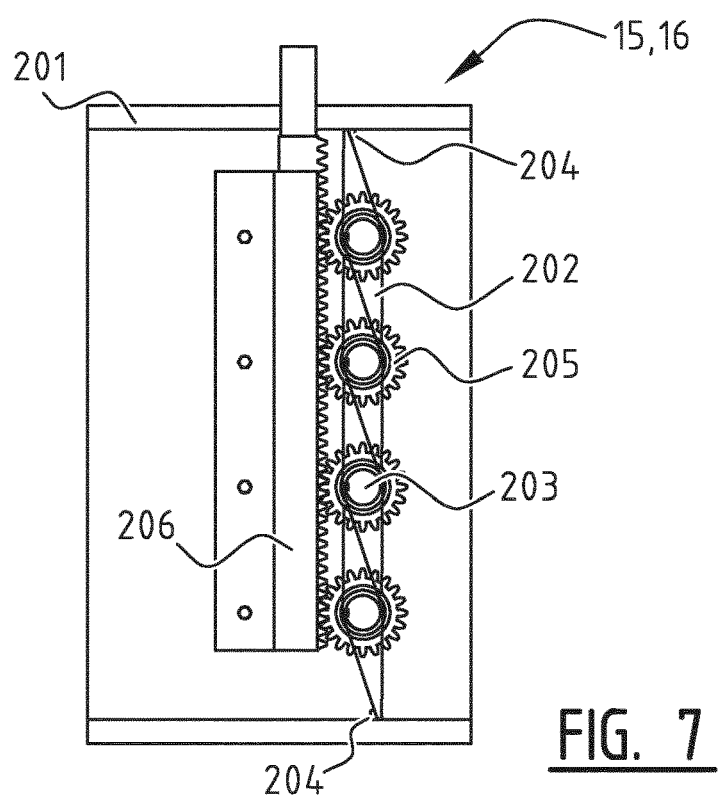

FIGS. 4 to 7 show a preferred embodiment of the inlet and outlet valve 15, 16 according to the invention. The valve 15, 16 comprises a tube section 201 having a rectangular cross section. A multitude of vanes 202 are rotatably mounted in the tube section 201. The vanes 202 have a relatively large rectangular longitudinal cross section to a first direction (as best seen in FIG. 5), a relatively small rectangular longitudinal cross section in a second direction perpendicular to said first direction (as best seen in FIG. 4), and a generally flat-rhombic (or generally hydrofoil) cross section in a third direction perpendicular to said first and second directions (as best seen in FIGS. 6 and 7). The circumferential wall around the axis of the of each vane 202 forms a closed water impermeable surface. By choosing suitable materials and stiffening technology the inner construction of the vanes 202 should be such that the vanes 202 are sufficiently stiff, so that the vanes 202 can withstand the high water pressure, yet are also lightweight, so that they can be rotated in a fast manner.

At the outer ends of the vanes 202 shaft ends 203 extend from the vanes along the axis of the vanes 202, said shaft ends 203 extending through holes in said tube section 201, such that the axes of said multitude of vanes 202 all extend in a parallel manner. The distances between the axes are approximately half the distance between the outer tips of the vanes 202, seen in the cross section in said third direction (see FIGS. 6 and 7), such that when the vanes 202 are rotated to the closed position as shown in FIG. 7, the lower half of the front surfaces and upper half of the back surfaces of all vanes form a single closed front surface and a single closed back surface, each in substantially a single flat plane perpendicular to the flow axis of the valve, at least in the area between the two axes of the outermost vanes 202. Also in said closed position, the other half of said front surfaces and the other half of said back surfaces of said vanes 202 rest against each other. In this manner it is achieved that in the open position of the vanes 202 a high water flow rate through the valve is possible, while in the closed position of the vanes a strong watertight seal is achieved. In order to completely seal the sides next to the two outer vanes 202, the tips of the vanes 202 rest against matching ridges 204 extending from the inner wall of the tube section 201.

The array of vanes 202 can be rotated by means of a rack 206 mating with pinions 205 attached to the shaft ends 203 on at least one outer side of the tube section 202. The rack 206 is arranged to be moved up and down by a hydraulic cylinder 207, which cylinder 207 is in turn controlled by a hydraulic Moog valve.

In FIGS. 4 and 6 the valve 15, 16 is shown in the open position which shows the rack 206 fully extended. In FIGS. 5 and 7 the valve 15, 16 is shown in the closed position which shows the rack 206 fully retracted. As shown in FIGS. 6 and 7, the vanes 202 are shaped in such a way as to minimize resistance to flow and also to allow them to come together in the closed position to form a comprehensive seal. When the valve 15, 16 is closed the vanes 202 are interlocked in such a way as to create a full seal along the face of the blades so creating a watertight seal to withstand the pressures.

Figure 8:
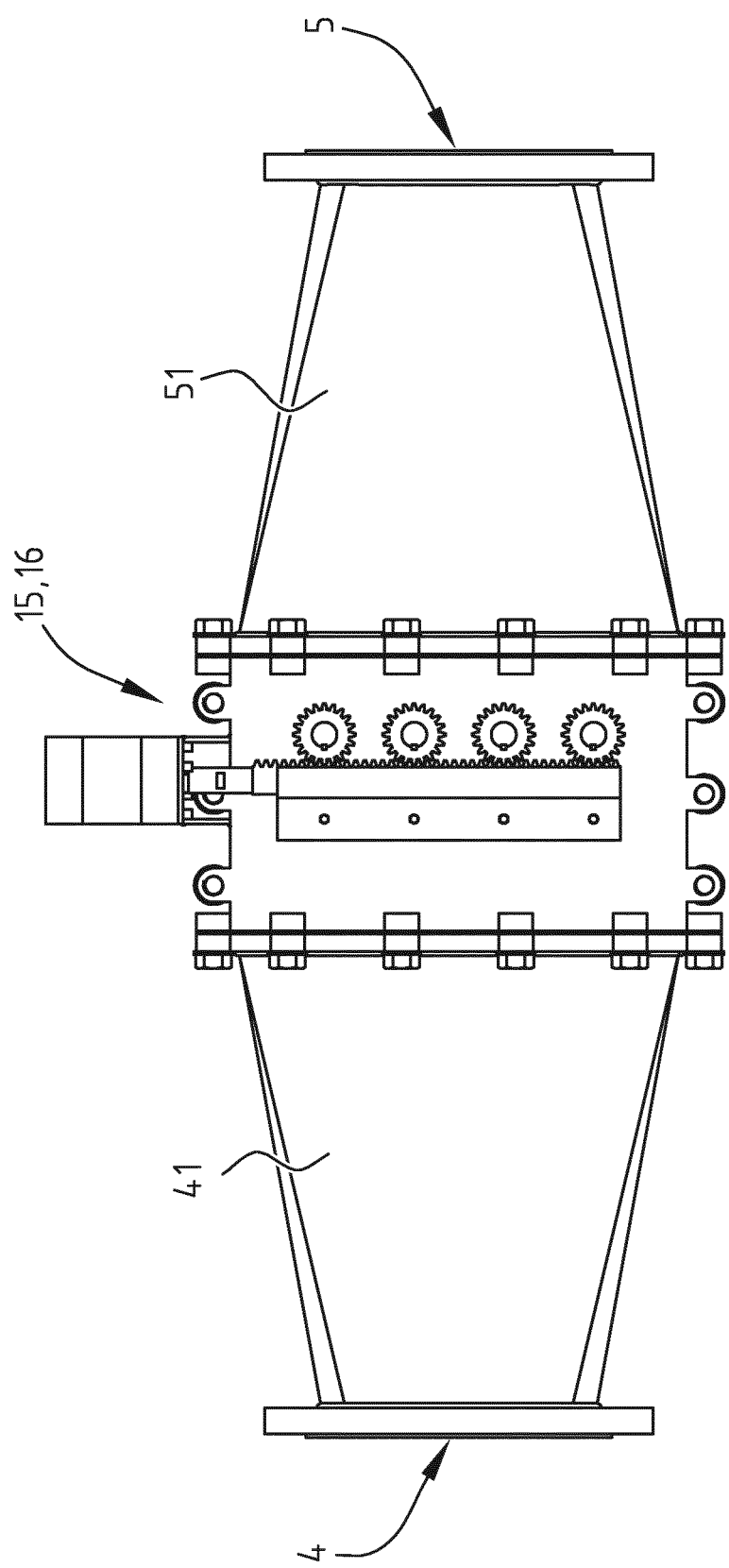
FIG. 8 shows a side view of the valve of FIGS. 4 to 7 with adaptor tubes attached to it.

Since the inflow and outflow pipes 4, 5 to and from the pump chamber are of circular cross-section, circular to rectangular flanged enclosures 41, 51 are provided at the entry 4 and exit 5 to and from the valve 15, 16, as shown in FIG. 8.

The invention has thus been described by means of a preferred embodiment. It is to be understood, however, that this disclosure is merely illustrative. Various details of the structure and function were presented, but changes made therein, to the full extent extended by the general meaning of the terms in which the appended claims are expressed, are understood to be within the principle of the present invention. The description and drawings shall be used to interpret the claims. The claims should not be interpreted as meaning that the extent of the protection sought is to be understood as that defined by the strict, literal meaning of the wording used in the claims, the description and drawings being employed only for the purpose of resolving an ambiguity found in the claims. For the purpose of determining the extent of protection sought by the claims, due account shall be taken of any element which is equivalent to an element specified therein.

The invention claimed is:

1. A device for generating energy from sea waves, comprising:
   a float for following the movement of sea waves; and
   a pump chamber having a variable volume for holding a variable volume of water, said pump chamber volume being arranged to change by the force exerted by said moving float,
   wherein said pump chamber comprises a water supply tube 4 and a water discharge tube, wherein said supply tube and said discharge tube are each provided with a valve, wherein said valves are arranged to close and open in alternating fashion with a cycle frequency equal to the cycle frequency of the sea waves,
   wherein at least one of the valves is a shutter valve comprising a tube section having a rectangular cross section,
   wherein a multitude of vanes are rotatably mounted in the tube section, said multitude of vanes having a relatively large rectangular longitudinal cross section in a first direction, a relatively flat rectangular longitudinal cross section in a second direction perpendicular to said first direction, and a generally flat cross section in a third direction perpendicular to said first and second directions, said third direction being the axis of the vane,
   wherein a circumferential wall around the axis of each vane forms a closed water impermeable surface,
   wherein the axes of said multitude of vanes all extend in a parallel manner, and
   wherein the distances between the axes of adjacent vanes are approximately half the distance between the outer tips of the vanes, seen in the cross section in said third direction, such that when the vanes are rotated to the closed position the lower half of the front surfaces and upper half of the back surfaces of all vanes form a single closed front surface and a single closed back surface, each in substantially a single flat plane perpendicular to the flow axis of the valve, said surfaces closing the opening of said tube section, and the other half of said front surfaces and the other half of said back surfaces of said vanes rest against each other.

2. The device in accordance with claim 1, wherein the vanes have a generally flat-rhombic cross section in a third direction perpendicular to said first and second directions.

3. The device in accordance with claim 1, wherein at the sides next to the two outer vanes, the tips of the vanes rest against matching ridges extending from the inner wall of the tube section.

4. The device in accordance with claim 1, wherein at the outer ends of the vanes shaft ends extend from the vanes along the axis of the vanes, said shaft ends extending through holes in said tube section.

5. The device in accordance with claim 4, wherein the array of vanes can be rotated by means of a rack mating with pinions attached to the shaft ends on at least one outer side of the tube section.

6. The device in accordance with claim 5, wherein the rack is arranged to be moved by a hydraulic cylinder.

7. The device in accordance with claim 6, wherein cylinder is controlled by a hydraulic Moog valve.

8. A shutter valve for alternatingly allowing and stopping a high pressure water flow, comprising a tube section having a rectangular cross section, wherein a multitude of vanes are rotatably mounted in the tube section, the vanes having a relatively large rectangular longitudinal cross section in a first direction, a relatively flat rectangular longitudinal cross section in a second direction perpendicular to said first direction, and a generally flat cross section in a third direction perpendicular to said first and second directions, said third direction being the axis of the vane,
wherein a circumferential wall around the axis of each vane forms a closed water impermeable surface,
wherein the axes of said multitude of vanes all extend in a parallel manner, and
wherein the distances between the axes of adjacent vanes are approximately half the distance between the outer tips of the vanes, seen in the cross section in said third direction, such that when the vanes are rotated to the closed position the lower half of the front surfaces and upper half of the back surfaces of all vanes form a single closed front surface and a single closed back surface, each in substantially a single flat plane perpendicular to the flow axis of the valve, said surfaces closing the opening of said tube section, and the other half of said front surfaces and the other half of said back surfaces of said vanes rest against each other.

9. The shutter valve in accordance with claim 8, wherein the vanes have a generally flat-rhombic cross section in a third direction perpendicular to said first and second directions.

10. The shutter valve in accordance with claim 8, wherein at the sides next to the two outer vanes, the tips of the vanes rest against matching ridges extending from the inner wall of the tube section.

11. The shutter valve in accordance with claim 8, wherein at the outer ends of the vanes shaft ends extend from the vanes along the axis of the vanes, said shaft ends extending through holes in said tube section.

12. The shutter valve in accordance with claim 11, wherein the array of vanes can be rotated by means of a rack mating with pinions attached to the shaft ends on at least one outer side of the tube section.

13. The shutter valve in accordance with claim 12, wherein the rack is arranged to be moved by a hydraulic cylinder.

14. The shutter valve in accordance with claim 13, wherein the cylinder is controlled by a hydraulic Moog valve.

* * * * *